United States Patent
Chen et al.

(10) Patent No.: US 7,899,056 B2
(45) Date of Patent: *Mar. 1, 2011

(54) DEVICE AND METHOD FOR REDUCING OVERHEAD IN A WIRELESS NETWORK

(75) Inventors: Wei-Peng Chen, Fremont, CA (US); Chenxi Zhu, Gaithersburg, MD (US); Masato Okuda, Tokorozawa (JP)

(73) Assignee: Fujitsu Limited, Kawasaki (JP)

( * ) Notice: Subject to any disclaimer, the term of this patent is extended or adjusted under 35 U.S.C. 154(b) by 70 days.

This patent is subject to a terminal disclaimer.

(21) Appl. No.: 12/352,887

(22) Filed: Jan. 13, 2009

(65) Prior Publication Data

US 2010/0177789 A1    Jul. 15, 2010

(51) Int. Cl.
  *H04L 12/28* (2006.01)
(52) U.S. Cl. .......... 370/393; 370/473; 370/477
(58) Field of Classification Search .......... 370/230, 370/231, 229, 252, 310, 393, 389, 238, 471, 370/474, 447, 468, 311, 324, 503, 509, 510, 370/511, 512, 513, 514, 473, 477, 535; 375/211, 375/260, 308, 329, 240.27; 709/231, 239, 709/249, 31; 380/28, 29, 41, 270, 273, 283, 380/251, 278; 713/263, 168; 714/777, 776, 714/778, 775, 799
See application file for complete search history.

(56) References Cited

U.S. PATENT DOCUMENTS

| | | | | |
|---|---|---|---|---|
| 4,748,619 A | * | 5/1988 | Vigarie et al. | 370/349 |
| 5,757,913 A | * | 5/1998 | Bellare et al. | 713/168 |
| 6,185,717 B1 | * | 2/2001 | Fukunaga et al. | 714/777 |
| 7,171,001 B2 | * | 1/2007 | Tuvell et al. | 380/278 |
| 7,215,667 B1 | | 5/2007 | Davis | 370/389 |
| 7,400,733 B1 | * | 7/2008 | Cam-Winget et al. | 380/283 |
| 7,412,542 B1 | * | 8/2008 | Newson et al. | 709/249 |
| 2001/0030963 A1 | * | 10/2001 | Yoshimura et al. | 370/393 |
| 2004/0123102 A1 | * | 6/2004 | Gehrmann et al. | 713/161 |
| 2004/0181607 A1 | * | 9/2004 | Xu et al. | 709/239 |
| 2006/0050869 A1 | * | 3/2006 | Tuvell et al. | 380/28 |
| 2006/0245505 A1 | * | 11/2006 | Limberg | 375/240.27 |
| 2007/0014237 A1 | * | 1/2007 | Nishibayashi et al. | 370/229 |
| 2007/0112972 A1 | * | 5/2007 | Yonge et al. | 709/231 |
| 2008/0120728 A1 | * | 5/2008 | Jiang | 726/30 |
| 2008/0165713 A1 | * | 7/2008 | Nishibayashi et al. | 370/310 |
| 2008/0165968 A1 | * | 7/2008 | Yadav et al. | 380/270 |

(Continued)

OTHER PUBLICATIONS

Brower et al., *Integrating Header Compression with IPSEC*, MILCOM 2006.

(Continued)

*Primary Examiner* — Aung S Moe
*Assistant Examiner* — Abdullah Riyami
(74) *Attorney, Agent, or Firm* — Baker Botts L.L.P.

(57) ABSTRACT

A method for reducing overhead includes identifying a plurality of packets that are all to comprise at least one common piece of security information. The method also includes concatenating the plurality of packets into a single jumbo packet. The method further includes applying a single set of security information to the jumbo packet. The single set of security information is based on the at least one common piece of security information.

20 Claims, 3 Drawing Sheets

U.S. PATENT DOCUMENTS

| | | | |
|---|---|---|---|
| 2008/0175265 A1* | 7/2008 | Yonge et al. | 370/447 |
| 2008/0262798 A1* | 10/2008 | Kim et al. | 702/189 |
| 2008/0304432 A1* | 12/2008 | Lee et al. | 370/311 |
| 2009/0060009 A1* | 3/2009 | Qian et al. | 375/211 |
| 2009/0067336 A1* | 3/2009 | Cho et al. | 370/238 |
| 2009/0154454 A1* | 6/2009 | Wittenschlaeger | 370/389 |
| 2010/0031124 A1* | 2/2010 | Shinagawa et al. | 714/777 |
| 2010/0098254 A1* | 4/2010 | Chowdhary et al. | 380/270 |

OTHER PUBLICATIONS

Ertekin et al., *Integration of Robust Header Compression (ROHC) Over ipSEC Security Associations*, draft-ietf-rohc-hcoipsec-07.txt, http://www.ietf.org/internet-drafts/draft-ietf-rohc-hcoipsec-07.txt, Dec. 31, 2007.

Chen et al., U.S. Appl. No. 12/391,760, filed Feb. 24, 2009, *System and Method for Reducing Overhead in a Wireless Network*.

* cited by examiner

DEVICE AND METHOD FOR REDUCING OVERHEAD IN A WIRELESS NETWORK

TECHNICAL FIELD

This invention relates in general to wireless networking and more particularly, to a device and method for reducing overhead in a wireless network.

BACKGROUND

Wireless radio frequency spectrum is a precious and scarce resource for wireless operators in any wireless system. Accordingly, efficient usage of the spectrum is always desired for wireless operators. In particular, Medium Access Control (MAC) overhead efficiency is a key factor to achieve spectrum efficiency. MAC overhead in wireless systems includes packet headers, control and management packets, security context, message authentication code, etc. Reducing MAC overheads as much as possible can significantly improve MAC efficiency and thus conserve wireless resources.

SUMMARY

In accordance with a particular embodiment, a method for reducing overhead includes identifying a plurality of packets that are all to comprise at least one common piece of security information. The method also includes concatenating the plurality of packets into a single jumbo packet. The method further includes applying a single set of security information to the jumbo packet. The single set of security information is based on the at least one common piece of security information.

Technical advantages of particular embodiments may include allowing a wireless network to more efficiently communicate packets. Accordingly, jumbo packets comprising multiple concatenated packets may reduce packet overhead by reducing the number of times the same security information is used for the different packets. This size reduction may be achieved with little or no negative impact on the security of the packets.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
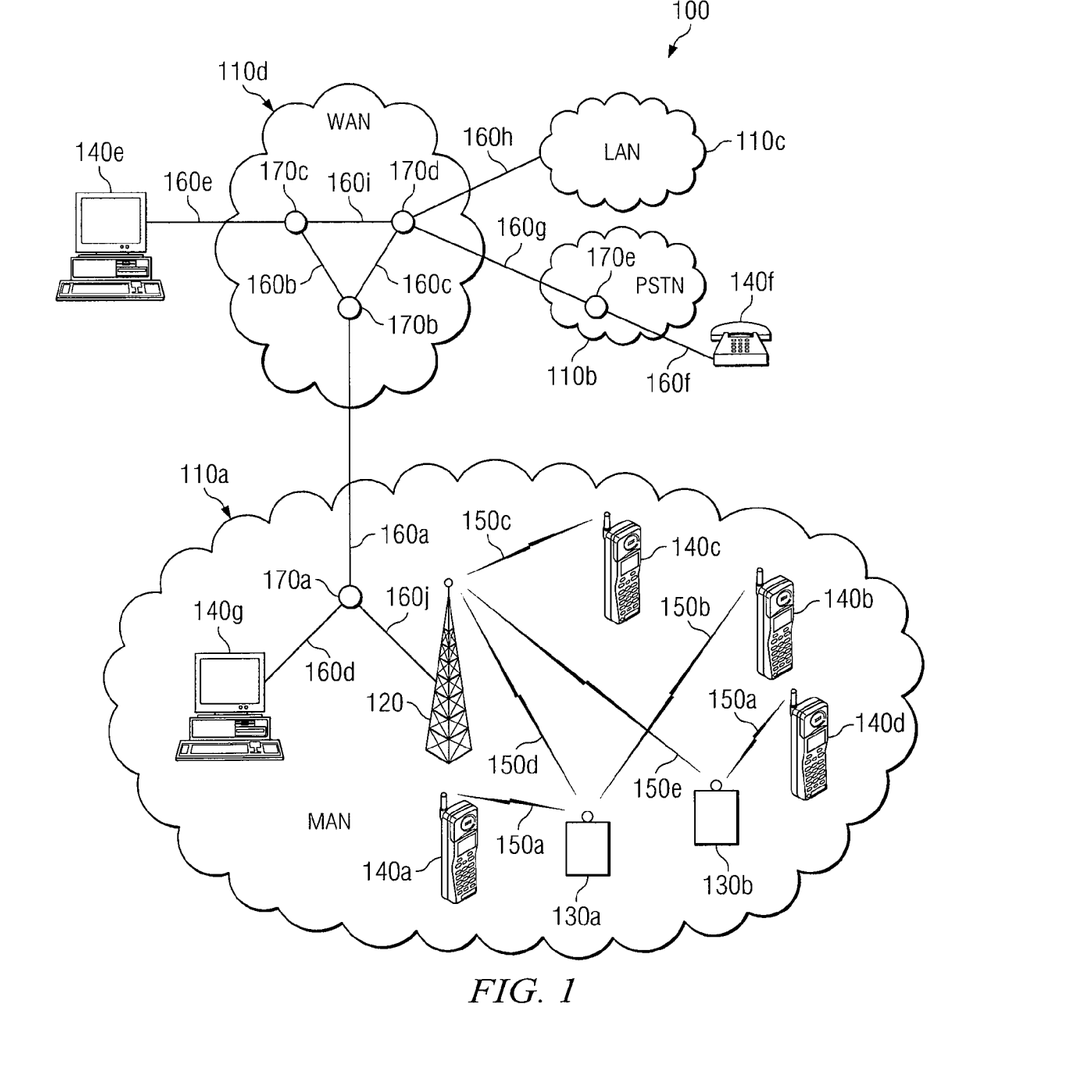
FIG. 1 illustrates a communication system comprising various communication networks, in accordance with particular embodiments.

FIG. 1 illustrates a communication system comprising various communication networks, in accordance with particular embodiments. Communication system 100 may be comprised of multiple interconnected networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110*a* may comprise an 802.16 wireless network (e.g., 802.16j or 802.16m), popularly known as WiMAX, which may include base stations, such as base station 120, and relay stations, such as relay stations 130. Network 110*a* may provide for the use of relay stations 130 by implementing 802.16j. A WiMAX network that uses relay stations may be referred to as a mobile multi-hop relay (MMR) network.

Within a network using a wireless protocol (e.g., 802.16m), such as network 110*a*, communications between components may be done with packets. Besides the data to be communicated, these packets may include MAC overhead. The overhead may include headers containing information related to the packet (e.g., the source, the destination, the size of the payload, etc.) as well as security information (e.g., message authentication code, security context, etc.). This information can create significant overhead because it is contained in each packet but does not directly contribute to the communication of actual desired data or information. While the information may cause overhead, it may be needed to provide the packets with integrity protection and encryption from potential security attacks and eavesdropping. In particular embodiments, the overhead may be reduced by concatenating two or more packets into a single jumbo packet and then compressing the header and/or reducing the amount of security information used for the concatenated packets.

The packets (and jumbo packets) may be communicated between components of wireless network 110*a* via wireless links. More specifically, between each endpoint, relay station and/or base station there may be a wireless connection or link, such as wireless connections 150. Wireless connections 150 may each comprise their own various wireless resources such as, for example, a combination of a particular center frequency, a particular bandwidth, a particular time slot, and/or a particular subchannel (for example, as described in a downlink or uplink map). The actual properties of a particular wireless connection 150 may depend on the communication standard used (e.g., WiMAX).

In wireless network 110*a*, MAC overhead may include packet headers, control and management packets, security information, etc. For simplicity, the term security information may be used as a general term for the mechanism or mechanisms that may be employed to protect (e.g., authentication) a packet payload. For example, in 802.16 systems, Ciphertext message authentication code (CMAC) values for data packets or CMAC tuples/CMAC digests for MAC management messages may be considered as security information. Another example of the security information is the authentication header in IPSec.

Although communication system 100 includes four different networks, networks 110*a*-110*d*, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, globally distributed network such as the Internet, Intranet, Extranet, or any other form of wireless or wired networking. For purposes of illustration and simplicity, network 110a is a MAN that may be implemented, at least in part, via WiMAX, network 110b is a PSTN, network 110c is a LAN, and network 110d is a WAN.

In the depicted embodiment, networks 110a, 110c and 110d may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b or 110d (e.g., nodes 170e or 170c may comprise a gateway). The gateway may allow PSTN 110b to be able to communicate with non-PSTN networks such as networks 110a, 110c and 110d.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170e may comprise a gateway. Node 170e, as a gateway, may translate communications between the various protocols used by different networks.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140d may include a cell phone, an IP telephone, a computer, a video monitor, a camera, a personal data assistant or any other hardware, embedded software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
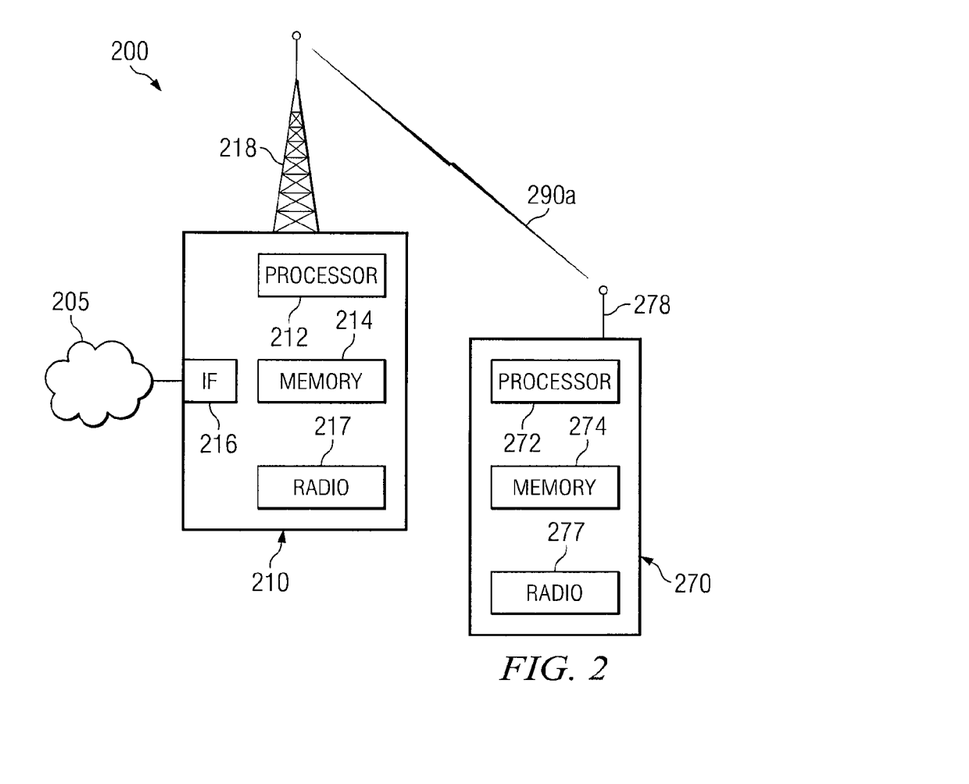
FIG. 2 illustrates a wireless network comprising a more detailed view of an endpoint and a base station, in accordance with particular embodiments.

FIG. 2 illustrates a wireless network comprising a more detailed view of an endpoint and a base station, in accordance with particular embodiments. The depicted embodiment is a simplified network comprising IP network 205, base station 210, and endpoint 270. In different embodiments network 200 may comprise any number of wired or wireless networks, base stations, endpoints, and/or any other components (e.g., relay stations) that may facilitate or participate in the communication of data and/or signals whether via wired or wireless connections.

In the depicted embodiment, base station 210 comprises processor 212, memory 214, interface 216, radio 217 and antenna 218. Similarly, endpoint 270 comprises processor 272, memory module 274, radio 277, and antenna 278. These components may work together in order to provide wireless networking functionality, such as communicating packets using less overhead than a traditional wireless network.

Looking at the various components of network 200 in more detail, IP network 205 may comprise one or more of the networks 110 described above with respect to FIG. 1. For example, IP network 205 may comprise the Internet, a LAN, WAN, MAN, PSTN or some combination of the above.

For convenience, similar components of base station 210 and endpoint 270 will be discussed together where appropriate. Processors 212 and 272 may be microprocessors, controllers, or any other suitable computing devices, resources, or combinations of hardware, embedded software and/or encoded logic operable to provide, either alone or in conjunction with other components, (e.g., memory 214 and/or 274) wireless networking functionality. Such functionality may include providing various wireless features discussed herein. For example, processors 212 and 272 may be able to determine which packets to concatenate, and how to compress the headers and reduce the amount of security information. Additional examples and functionality provided, at least in part, by processors 212, 252 and 272 will be discussed below.

Memory modules 214 and 274 may be any form of volatile or non-volatile memory including, without limitation, magnetic media, optical media, random access memory (RAM), read-only memory (ROM), flash memory, removable media, or any other suitable local or remote memory component or components. Memory modules 214 and 274 may store any suitable data or information utilized by base station 210 and endpoint 270, respectively, including software embedded in a computer readable medium, and/or encoded logic incorporated in hardware or otherwise stored (e.g., firmware). For example, in particular embodiments memory modules 214 and 274 may store information regarding the cipher used as security for packets communicated between base station 210 and endpoint 270. Memory modules 214 and 274 may also maintain a list, database, or other organization of data useful for determining how to route data to the proper component.

Radios 217 and 277 may be coupled to or a part of antennas 218 and 278, respectively. Radios 217 and 277 may receive digital data that is to be sent out to other base stations, relay stations and/or endpoints via a wireless connection. Radios 217 and 277 may convert the digital data into a radio signal having the appropriate center frequency and bandwidth parameters. These parameters may have been determined ahead of time, for example by a combination of processor 212 and memory 214 of base station 210. The radio signal may then be transmitted via antennas 218 and 278 to the appropriate recipient. Similarly, radios 217 and 277 may convert radio signals received via antennas 218 and 278, respectively, into digital data to be processed by processors 212 or 272, as appropriate. Together, radio 217 and antenna 218, and radio 277 and antenna 278 may each form a wireless interface.

Base station 210 also comprises interface 216 which may be used for the wired communication of signaling and/or data between base station 210 and network 205. For example, interface 216 may perform any formatting or translating that may be needed to allow base station 210 to send and receive data from network 205 over a wired connection. While not depicted, endpoint 270 may also include wired interfaces.

Endpoint 270 may be any type of wireless endpoint able to send and receive data and/or signals to and from base station 210. Some possible types of endpoints 270 may include desktop computers, PDAs, cell phones, laptops, and/or VoIP phones.

As alluded to above, the components of base station 210 and endpoint 270 may work to reduce the amount of overhead within network 200. More specifically, base station 210 and endpoint 270 may communicate using jumbo packets that include two or more concatenated packets, a compressed header and/or reduced security information. The use of jumbo packets may reduce the amount of overhead compared to using individual, non-concatenated packets.

It may be assumed that communications between base station 210 and endpoint 270 are transmitted via packets. Initially, each packet may include one MAC header. In addition, it may be desired that the packets include security information (e.g., the packet is protected with a security algorithm). The inclusion of both a header and security information with each packet may occur even when the packet is disseminated through a security tunnel or over a single link. For convenience, it will be assumed that base station 210 is the transmitter and endpoint 270 is the receiver. In practice, any endpoint, base station or relay station (not depicted), may be a transmitter or receiver, as the case may be. Accordingly, with respect to creating, encoding, encrypting, transmitting, receiving, decrypting and decoding jumbo packets, the functionality and/or components described below may be applied to any base station, relay station or endpoint. The amount of overhead associated with the transmission of packets may be reduced by processor 212 applying header compression and sharing the security information with a set of concatenated packets before transmitting them via radio 210 and antennae 218.

Depending on the scenario, jumbo packets may, for example, be used to transmit multiple packets to the same component over a single link. As another example, jumbo packets may be transmitted via a secure tunnel spanning one or more links. Regardless of the situation, processor 212 may concatenate the two or more packets and then perform header compression and/or reduce the amount of security information. More specifically, with respect to header compression, each packet may start with its own complete header. Processor 212 may then search for and remove redundancies in the headers of the concatenated packets. With respect to security information reduction, those packets of the concatenated packets that would have had the same or similar security information had they been sent separately, may share the same security information from the jumbo packet. Both of these reduction techniques will be described in more detail below.

In order for the recipient of a jumbo packet to be able to decipher the contents it may need to know how the information is organized within the concatenated packet. Accordingly, before processor 212 applies any header compression methods or shares any security information from the jumbo packet, base station 210 and endpoint 270 (e.g., the transmitter and the receiver) may exchange information and agree on the settings and details of the compression algorithms. This may include selecting among different types of compression algorithms, rules of exclusions, etc. In the context of 802.16, this information may be communicated in the format of type-length-values (TLVs) in the dynamic service addition request/response (DSA-REQ/RSP) messages exchange. In some instance, a dynamic service change request/response (DSC-REQ/RSP) message exchange may be used to change compression settings.

Figure 3:
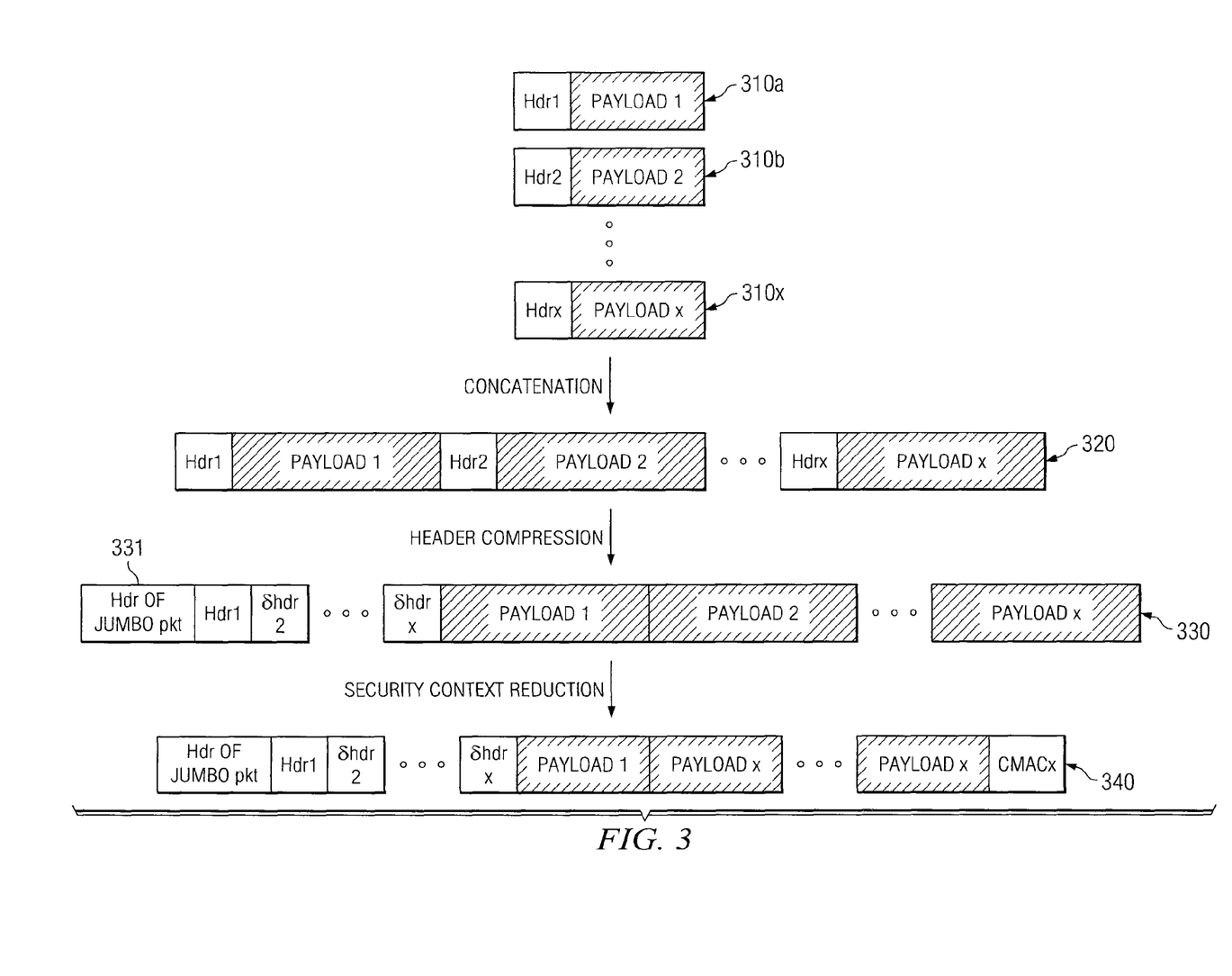
FIG. 3 illustrates the concatenation of several packets into a single jumbo packet having less overhead than the original packets, in accordance with particular embodiments.

The use of both header compression and security information reduction can be seen in FIG. 3. More specifically, packets 310 may represent multiple packets to be sent to endpoint 270. Packets 310 may then be concatenated into a single packet 320. Next, header compression may be applied to remove redundancy in the headers of the multiple packets as shown in jumbo packet 330. Then, any encryption, authentication, or other security measures that would be applied the individual packets (if sent alone) may be applied to jumbo packet 340 such that only one set of security information (e.g., CMAC value shown in FIG. 3) may be used for all the concatenated packets.

Particular embodiments may generate a new set of headers for each of the concatenated packets in the single packet 320 that uses fewer bits than were used by the original set of headers. In particular embodiments, this may be achieved by using one header as a base header and encoding the rest of the headers by the respective differences with respect to the base header or a previous header. For example, the first header may be the base header, the second header may be represented by a delta header (e.g., dhdr2) comprising differences between the first header and the second header, the third header may be represented by its own delta header (e.g., dhder3) comprising differences between the third header and the second header, or between the third header and the first header.

In particular embodiments, the differences between two headers may be determined by processor 212 using an 'exclusive or' (XOR, $\oplus$) operation on each bit of the bit strings for the two headers. Using this operation, a new bit string may be created that comprises a '0' each time the two bits are the same, and a '1' each time the two bits are different. For convenience, the resulting string of the $\oplus$ operation may be referred to as a delta header. The number of different bits between the two binary strings (e.g., those that result in a '1') may be called the hamming distance.

Using the known hamming distance between two original headers along with the length of the respective headers (e.g., the number of bits per header), it may be possible to determine the number of possible delta headers. More specifically, if the hamming distance between header one (Hdr1) and header 2 (Hdr2) is equal to 'm', and the two headers each comprise 'n' bits, then it may be determined that 'm' out of 'n' bits of Hdr2 are different from those in Hdr1. It may further be determined that there are $C(n;m)$ combinations to select which 'm' bits are different. Then, if Hdr1 is used as the base header, then there are $C(n;m)$ possibilities for Hdr2. The differences between Hdr1 and Hdr2 may be encoded using k bits, wherein $k=ceil(\log 2C(n;m))$, wherein 'ceil' is a ceiling function which maps a real number to the next higher integer.

This may best be seen by an example. Assume the two original headers Hdr1 and Hdr2, each have a length of 4 bits, wherein Hdr1=(1,0, 0,0) and Hdr2=(1,0, 1, 1). The difference between the two headers, delta header 2, denoted as dhdr2, would be dhdr2=(0,0, 1, 1) because the first two bits of Hdr1 and Hdr2 are the same and the second two bits are different. From dhdr2, processor 212 may determine the hamming distance is two because there are two different bits. Because two of the four bits of Hdr2 are different than Hdr1, there are six possible arrangements for the bits of dhdr2 (0: (0,0, 1, 1), 1: (0, 1,0, 1), 2: (1,0, 0, 1), 3: (0, 1, 1,0), 4: (1,0, 1,0), 5: (1, 1,0, 0)). Processor 212 may be able to encode these six possibilities using three bits. Thus, for our example because dhdr2= (0,0, 1, 1) processor 212 would use the first option (0) and the encoded value of dhdr2 would be '000'. Hdr1, the hamming distance value, two, and the encoded value '000' may then be used by processor 272 to reconstruct Hdr2.

While the previous example resulted in using 5 bits (2 bits for the hamming distance value and 3 bits for the encoding of dhdr2) to compress Hdr2 (which is larger than the original 4 bits of Hdr2), headers comprising increased length may experience increased benefits from the compression. For example, when the length of the headers' bit string equals 40 and the hamming distance value is 8, then only 27 bits would be needed to encode the possible combinations of dhdr2 and 6 bits to represent the hamming distance value. Thus, Hdr2 may be compressed from 40 bits to 33 (27+6) bits. In particular embodiments, processor 212 may determine whether compressing the headers actually lowers the number of bits required before it actually performs the compression.

As mentioned above, part of the compression relies on encoding the delta header (e.g., dhdr2) using one of several possible combinations. In some embodiments, all the possible combinations may be stored in memory of each component of the network (e.g., memory 214 and memory 274). In particular embodiments, an algorithm may be used to allow both processor 212 to encode the delta header, and processor 272 to decode the delta header.

The encoding algorithm may use the delta header, and the hamming distance of the two original headers to determine the encoding. In particular embodiments, the bits in the delta header may be numbered from the least significant bit (LSB) starting from 0 to the most significant bit (MSB) ending at n−1. In certain embodiments, the encoding algorithm may use the following formula related to Binomial coefficients: $C(n;m)=C(n-1;m-1)+C(n-1;m)$. In other words, the left hand side represents the total number of possible combinations of 'm' bits out of 'n' bits being '1'. The right hand side includes two sub-cases: the first term represents the number of combinations with a first bit equal to '1' while the second term is the number of combinations with the first bit equal to '0'. In particular embodiments, the encoding may begin by encoding as '0' the delta header with 'm' LSBs equal to '1'. Then, the most significant bit of '1' may be moved to the left, each move left increases the encoded value by one until the MSB reaches the left end. Then, two of the MSBs are moved to the left from their original position (all at the right side). The operations continue iteratively until all 'm' MSBs are equal to '1' (e.g., all the '1's are at the left side). The case when n=5 and m=3 is shown in the table below:

The left most column is the delta header and the right most column is the encoded value.

The values in each column for Bits 0-4 are the values which contribute part of the entire encoding value. The encoding principles to decide the contributed value for one bit are:

Start computing the encoding value from the LSB (i.e. right most bit).

Assign 0 to the value of the bit equal to '1'.

Assign the value $C(n-i-1; m-c-1)$ to the i-th LSB bit when its value is equal to 0, wherein c is the number of accumulative bits with values equal to '1' counting from the right most bit to the i-th LSB.

For example, for delta string '10011' the value of Bit 2 is $C(5-2-1; 3-2-1)$, which is equal to '1' and the value of the Bit 3 is $C(5-3-1; 3-2-1)$, which is equal to '1'. Thus, the encode value is the sum of these two values, which is equal to two.

In particular embodiments, processor 212 may encode the delta header using a while loop. For example, the following while loop may output an encoded value (val):

```
1.   c = 0, val = 0, i = 0;
2.   while (c < m) {
3.       if (d[i] == 1)    c ++;
4.       else     val += C(n-i-1; m-c-1);
5.       i++;}
6.   return val;
``` wherein d[i] is the ith bit of the delta string (determined by the XOR operation of two headers) having 'n' bits and a hamming distance of 'm'.

Similarly, when endpoint 270 receives the bit string length (n), the hamming distance (m), and the encoded value (val), it may be possible for processor 272 to use the following loops to determine the original delta string:

```
1.   c = 0, i = 0;
2.   while (val > 0) {
3.       if (val ≤ C(n-i-1; m-c-1) ) {
4.           d[i]=1; c ++;}
5.       else {
6.           d[i]=0; val -= C(n-i-1; m-c-1);}
7.       i++;}
8.   while (c ≤ m) {
9.       d[i]=1; c++; i++;}
10.  for (j=i; j < n; j++)    d[j]=0;
11.  return d;
```

After decoding the encoded value of the delta header, endpoint 270 may be able to easily decompress the headers by applying XOR operations to the base header and the delta header.

| delta header | Bit 4 | Bit 3 | Bit 2 | Bit 1 | Bit 0 | encode value |
|---|---|---|---|---|---|---|
| 00111 | 0 | 0 | 0 | 0 | 0 | 0 |
| 01011 | 0 | 0 | C(5-3; 3-3) | 0 | 0 | 1 |
| 10011 | 0 | C(5-4; 3-3) | C(5-3; 3-3) | 0 | 0 | 2 |
| 01101 | 0 | 0 | 0 | C(5-2; 3-2) | 0 | 3 |
| 10101 | 0 | C(5-4; 3-3) | 0 | C(5-2; 3-2) | 0 | 4 |
| 11001 | 0 | 0 | C(5-3; 3-2) | C(5-2; 3-2) | 0 | 5 |
| 01110 | 0 | 0 | 0 | 0 | C(5-1; 3-1) | 6 |
| 10110 | 0 | C(5-4; 3-3) | 0 | 0 | C(5-1; 3-1) | 7 |
| 11010 | 0 | 0 | C(5-3; 3-2) | 0 | C(5-1; 3-1) | 8 |
| 11100 | 0 | 0 | 0 | C(5-2; 3-1) | C(5-1; 3-1) | 9 |

The same techniques used in compressing two headers may be applied to multiple headers. More specifically, one of the headers may be chosen as the base header, then the next header may be encoded based on the difference between the second header with the base header. Subsequent headers may then be based on differences with either the original base header or one of the other previous headers.

When compressing headers, it may be desirable to use as few bits as possible to encode the delta header. Accordingly, it may be desirable to find the shortest spanning path (e.g., the shortest Hamiltonian path) or the minimum spanning tree for encoding the multiple delta bit strings. Accordingly, the base header may be selected from among the multiple headers using any of a variety of different techniques and/or strategies that provide the shortest path or minimum spanning tree. For example, techniques such as a single path approach, a star topology approach, or a tree topology approach may be used.

The single path approach may involve compressing multiple headers wherein each header (after the first base header) is encoded based on its previous header. When using such an approach, it may be desirable to find the shortest Hamiltonian path to cover all the headers. On possible way to approximate a solution may be to find a spanning path. The first header may then be considered as the base header, denoted as Hdr1. In order for the receiver to decompress all the headers, the transmitter may include in the encoding sequence the following information: x, HD2, HD3, . . . , HDx, Hdr1, En2, En3, . . . , Enx (x is the number of the headers; HDx is the hamming distance for Hdrx; and Enx is the encoded value for dhdrx where dhdrx=Hdrx ⊕ Hdrx−1). Upon reception of the encoding sequence, endpoint 270 may decompress all the headers sequentially starting from the base header, Hdr1, which may be recovered as intact. Eventually, endpoint 270 may decompress Hdrx after first reconstructing Hdrx-1, then decoding Enx to obtain dhdrx, the differences between Hdrx and Hdrx-1, and finally applying Hdrx-1⊕dhdrx to get Hdrx.

In the star topology approach, processor 212 may find a single base header and then the rest of the headers may be encoded based on the common base header. Accordingly, it may be desirable to find a base header such that the sum of the hamming distances from the base header to all other headers is minimized. After finding an appropriate base header for the star topology, denoted as Hdr1, base station 210 may then communicate the following information to endpoint 270: x, HD2, HD3, . . . , HDx, Hdr1, En2, En3, . . . , Enx. Once received, the headers may all be reconstructed from the common header Hdr1 by processor 272. For example, Hdrx may be reconstructed by first decoding dhdrx from the encoded value Enx. Then, the bit string of Hdrx can be recovered by applying Hdr1⊕dhdrx.

In the tree topology approach, processor 212 may find the minimum spanning tree wherein the parent header is used as the reference for its immediate children headers. The time complexity of finding the minimum spanning tree may be determined by Prim's algorithm. The pattern of the tree may be represented using any of a variety of known techniques such as depth first search (DFS) or breadth first search (BFS). Regardless of the technique used to represent the tree, it may be desirable to transform the symbol representations of the tree structure into a binary representation so that it may be easily conveyed to a receiver. In other words, the symbols used to indicate a change in level or other such information about the structure of the tree may need to be represented in a binary manner for communication to endpoint 270. Once the tree structure has been represented, base station 210 may then communicate the following information to endpoint 270: x, the tree representation, hamming distances for each header with respect to its parent, the root header from which all other headers descend, the encoded value for the difference between each descendent header and its parent header.

Depending on the embodiment, additional constraints may be placed on the compression of headers. For example, certain bits in the header may be excluded from compression. For instance, in the context of 802.16e, the field of "header checksum" may be excluded from compression. In this scenario, the last eight bits in the 802.16 generic MAC header may be kept intact in the encoded delta representation. As another example of an additional constraint, the headers of concatenated packets may be divided into several groups based on a set of rules. The rules may be implemented to increase the compression efficiency when different types of headers are concatenated into a single jumbo packet. For instance, in the context of 802.16e, the cases of HT=0 (header with payload) and HT=1 (signaling header without payload) may be separated into two groups. Yet another constraint may be to require the compression ratio to be above a certain threshold before proceeding.

In some embodiments, besides compressing the headers, processor 212 may also share security information, including encryption and integrity protection, between the concatenated packets. This may be done regardless of whether or not the jumbo packet includes compressed headers. Processor 212 may reduce the overhead associated with security information by using one set of security information to protect those packets within the jumbo packet that would otherwise require one set of security information for each packet of the jumbo packet. More specifically, if there are, for example, multiple packets being concatenated that all use a common security key to encrypt/decrypt/authenticate the contents of the respective packets, then the same security key may be applied to the jumbo packet. By using only a single key, the packet overhead is reduced from multiple sets of security information to a single set of security information without any significant increase in processing requirements or reduction in security of the packets or their payload.

There may be at least two instances in which security information may be shared or reduced for a jumbo packet. The first instance occurs in single hops within a general communication system. More specifically, the packets communicated between two stations within a single hop of each other may use much, if not all, of the same security information. Thus, base station 210 may be able to concatenate the packets sent towards endpoint 270, apply the same key to the jumbo packet and use only one set of security information to protect all the concatenated packets of the jumbo packet. The second instance occurs with the use of a secure tunnel in a multi-hop relay system (e.g., the secure tunnel may pass through one or more relay stations). At the two end stations of the secure tunnel, the same key may be used to encrypt/decrypt all the packets passing through the tunnel. Therefore, that key may be shared amongst the packets of the jumbo packet being sent through the secure tunnel in multi-hop systems.

Depending on the embodiment or scenario, the security information for a packet may be the authentication data for the encrypted data packets or the authentication data for the control packets shown in plaintext. For example, in the context of 802.16, the security information for data packets in advanced encryption standard-combined cypher machine (AES-CCM, wherein CCM represents a CTR mode with CBC-MAC; CTR represents counter mode encryption; CBC represents cipher block chaining; and MAC represents message authentication code) mode may be a CMAC value while the security information for control packets may be CMAC digest or CMAC tuples. In the former case, the same CMAC value may be used to authenticate the entire payload of the jumbo packet (e.g., the relay MAC PDU in 802.16j). In the latter case, the same CMAC tuple may be applied to all the MAC management messages concatenated in the jumbo packet to authenticate all the MAC management messages.

By using a single set of security information for all the packets concatenated in the jumbo packet the overall overhead associated with communicating packets is reduced without significantly impacting security. More specifically, each jumbo packet may only need to carry one set of security information. This security information may be able to protect the jumbo packet, and thus the packets therein. Accordingly, the security of the packets within the jumbo packet is not appreciably impaired while the overhead is significantly reduced.

In particular embodiments, it may be desirable to apply an automatic repeat request (ARQ) operation to strengthen the robustness of the transmission of a long concatenated packet over, for example, a wireless link. Thus, if some blocks of data are lost, the receiver may be able to send a negative acknowledgement (NACK) back to the sender. The sender may then send the lost blocks without retransmitting all the blocks in the concatenated packets. Similarly, in certain embodiments, a hybrid ARQ (HARQ) may be included to enhance the robustness of the transmission on the wireless link at the physical PHY level.

Thus far, several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations to provide the necessary coverage. Furthermore, in some embodiments, base station 210 may have more or less radios. Some embodiments may include additional or different features.

Figure 4:
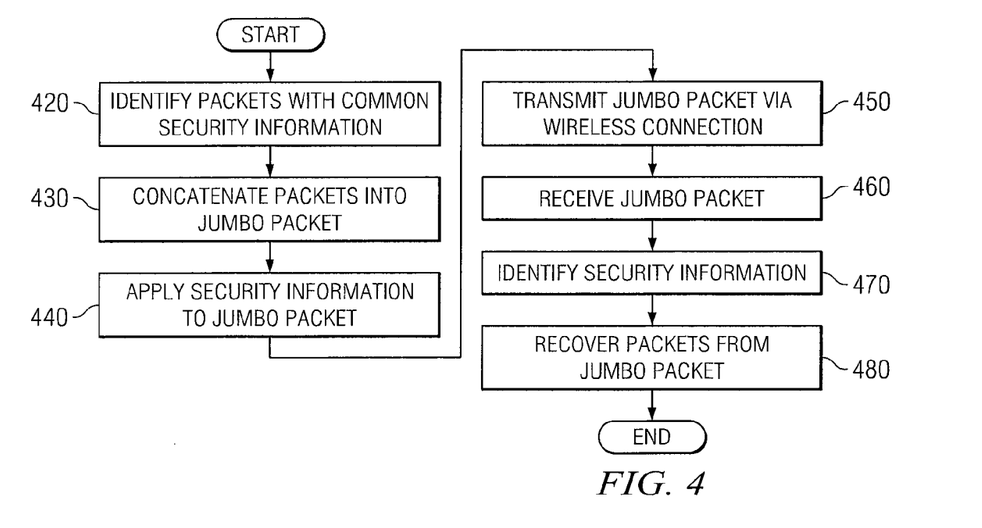
FIG. 4 illustrates a method for reducing overhead in a wireless network, in accordance with particular embodiments.

FIG. 4 illustrates a method for reducing overhead, in accordance with particular embodiments. For purposes of simplicity for the scenario depicted in FIG. 4, it may be assumed that an endpoint is sending several packets to a base station (the same steps would apply for packets sent from a base station). The method begins at step 420 where a plurality of packets that are all to comprise at least one common piece of security information are identified. In particular embodiments, this may comprise examining the security association or the security information that would have been attached to each packet if it were sent individually. The common security information may include, for example, a key that provides encryption, decryption and/or authentication security for the respective packet.

At step 430 the endpoint concatenates into a jumbo packet the plurality of packets that were identified as having common security information. At this point, the common security information is not included in either the jumbo packet or concatenated packets. Depending on the situation, the plurality of packets may share a common destination address or may be packets intended to be sent in a single PHY burst. Depending on the situation, the packets may comprise data packets, control packets, or a combination of control and data packets.

Then, at step 440, to maintain the security of the packets, a single set of security information, based on the at least one piece of common security information, is applied to the jumbo packet. In other words, a single security information for the jumbo packet is used to protect all the concatenated packets.

At step 450 the jumbo packet is transmitted, via a wireless connection, to the recipient base station. Accordingly, at step 460 the jumbo packet is received by the base station. In particular embodiments the jumbo packet may be sent via an 802.16 wireless connection. In some embodiments, the jumbo packet may be sent as a single burst.

At step 470 the security information is identified within the jumbo packet. More specifically, the base station may be able to identify the security information that was applied to the jumbo packet. Then, at step 480 the base station is able to recover the plurality of packets based on the identified security information from jumbo packet. More specifically, the base station may be able to decrypt, authorize, etc. the packets contained within the jumbo packet. Thus, even though the concatenated packets did not initially comprise the common security information, they were still protected with the same level of security through the security information applied to the jumbo packet. Accordingly, the overhead associated with transmitting the packets, with their security information, is reduced without having to make significant sacrifices to the actual security of the packets.

Some of the steps illustrated in FIG. 4 may be combined, modified or deleted where appropriate, and additional steps may also be added to the flowchart. For example, in some embodiments the headers associated with the concatenated packets may be compressed. Additionally, steps may be performed in any suitable order without departing from the scope of particular embodiments. For example, in particular embodiments, the packets may have the security information already attached thereto. Accordingly, the method may include removing the common security information from each of the packets to be concatenated and applying a single instance of the common security information to the jumbo packet.

Although particular embodiments have been described in detail, it should be understood that various other changes, substitutions, and alterations may be made hereto without departing from the spirit and scope of particular embodiments. For example, features and functionality discussed with respect to a particular figure, such as FIG. 2, may be used in connection with features and functionality discussed with respect to another such figure, such as FIG. 1, according to operational needs or desires. In addition, any elements may be provided as separate external components, integrated internal components, or some combination thereof, to communication system 100, network 200, or each other where appropriate. Particular embodiments contemplate great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

The invention claimed is:

1. A method for reducing overhead, comprising:
 identifying a plurality of packets that are all to comprise at least one common piece of security information, each of the plurality of packets comprising a header;
 concatenating the plurality of packets into a single jumbo packet;
 identifying a base header from among the headers of the plurality of packets;

determining a plurality of hamming distances, each hamming distance associated with a respective packet of the plurality of packets other than the base header and indicative of a number of differences between the respective header and another header of the plurality of headers;

determining a plurality of encoded values, each encoded value associated with a respective packet of the plurality of packets other than the base header and determined based on a difference between the respective header and at least one other header;

generating a jumbo header for the jumbo packet, the jumbo header comprising the base header, the plurality of hamming distances, and the plurality of encoded values; and applying a single set of security information to the jumbo packet, the single set of security information based on the at least one common piece of security information.

2. The method of claim 1, wherein the at least one common piece of security information comprise a common message authentication code.

3. The method of claim 1, wherein the at least one common piece of security information comprises a key operable to provide a security feature selected from the group consisting of encryption, decryption, and authentication.

4. The method of claim 1, wherein:
the plurality of packets concatenated into the jumbo packet comprise a plurality of data packets; and
the at least one common piece of security information comprises authentication data for the data packets.

5. The method of claim 1, wherein:
the plurality of packets concatenated into the jumbo packet comprises a plurality of control packets; and
the at least one common piece of security information comprises authentication data for the control packets.

6. The method of claim 1:
wherein concatenating a plurality of packets into a single jumbo packet comprises concatenating a plurality of packets to be sent in a single PHY burst into a single jumbo packet; and
further comprising transmitting the jumbo packet via a wireless connection to a receiver operable to recover the plurality of packets based on the at least one common piece of security information applied to the jumbo packet.

7. A method for reducing overhead, comprising:
receiving a jumbo packet comprising a jumbo header and a plurality of packets concatenated therein;
identifying within the jumbo header, a base header associated with one packet of the plurality of packets and at least one hamming distance and at least one encoded value associated with each packet of the plurality of packets other than the packet having the associated base header;
recreating a plurality of headers associated with the plurality of packets based on the base header and the respective hamming distance and encoded value;
identifying at least one piece of security information applied to the jumbo packet, the plurality of concatenated packets absent the identified piece of security information; and
recovering the plurality of packets within the jumbo packet based on the at least one piece of security information applied to the jumbo packet.

8. The method of claim 7, wherein identifying the at least one piece of security information comprises identifying the security information within the header of the jumbo packet.

9. The method of claim 7, wherein:
the plurality of packets concatenated into the jumbo packet comprise a plurality of data packets; and
the at least one piece of security information comprises authentication data for the data packets.

10. The method of claim 7, wherein:
the plurality of packets concatenated into the jumbo packet comprises a plurality of control packets; and
the at least one piece of security information comprises authentication data for the control packets.

11. A device for reducing overhead comprising, a processor operable to:
identify a plurality of packets that are all to comprise at least one common piece of security information, each of the plurality of packets comprising a header;
concatenate the plurality of packets into a single jumbo packet;
identify a base header from among the headers of the plurality of packets;
determine a plurality of hamming distances, each hamming distance associated with a respective packet of the plurality of packets other than the base header and indicative of a number of differences between the respective header and another header of the plurality of headers;
determine a plurality of encoded values, each encoded value associated with a respective packet of the plurality of packets other than the base header and determined based on a difference between the respective header and at least one other header;
generate a jumbo header for the jumbo packet, the jumbo header comprising the base header, the plurality of hamming distances, and the plurality of encoded values; and
apply a single set of security information to the jumbo packet, the single set of security information based on the at least one common piece of security information.

12. The device of claim 11, wherein the at least one common piece of security information comprise a common message authentication code.

13. The device of claim 11, wherein the at least one common piece of security information comprises a key operable to provide a security feature selected from the group consisting of encryption, decryption, and authentication.

14. The device of claim 11, wherein:
the plurality of packets concatenated into the jumbo packet comprise a plurality of data packets; and
the at least one common piece of security information comprises authentication data for the data packets.

15. The device of claim 11, wherein:
the plurality of packets concatenated into the jumbo packet comprises a plurality of control packets; and
the at least one common piece of security information comprises authentication data for the control packets.

16. The device of claim 11:
wherein the processor operable to concatenate a plurality of packets into a single jumbo packet comprises a processor operable to concatenate a plurality of packets to be sent in a single PHY burst into a single jumbo packet; and
further comprising an interface coupled to the processor and operable to transmit the jumbo packet via a wireless connection to a receiver operable to recover the plurality of packets based on the at least one common piece of security information applied to the jumbo packet.

17. A device for reducing overhead, comprising:
an interface operable to receive a jumbo packet comprising a jumbo header and a plurality of packets concatenated therein; and
a processor coupled to the interface and operable to:
- identify within the jumbo header, a base header associated with one packet of the plurality of packets and at least one hamming distance and at least one encoded value associated with each packet of the plurality of packets other than the packet having the associated base header;
- recreate a plurality of headers associated with the plurality of packets based on the base header and the respective hamming distance and encoded value;
- identify at least one piece of security information applied to the jumbo packet, the plurality of concatenated packets absent the identified piece of security information; and
- recover the plurality of packets within the jumbo packet based on the at least one piece of security information applied to the jumbo packet.

18. The device of claim 17, wherein the processor operable to identify the at least one piece of security information comprises a processor operable to identify the security information within the header of the jumbo packet.

19. The device of claim 17, wherein:
the plurality of packets concatenated into the jumbo packet comprise a plurality of data packets; and
the at least one piece of security information comprises authentication data for the data packets.

20. The device of claim 17, wherein:
the plurality of packets concatenated into the jumbo packet comprises a plurality of control packets; and
the at least one piece of security information comprises authentication data for the control packets.

* * * * *